United States Patent [19]

Lindemann

[11] 4,098,986
[45] Jul. 4, 1978

[54] COPOLYMERIZABLE MONOETHYLENICALLY UNSATURATED PHOSPHONATES AND FIRE RETARDANT COPOLYMERS CONTAINING THE SAME

[75] Inventor: Martin K. Lindemann, Greenville, S.C.

[73] Assignee: Chas. S. Tanner Co., Greenville, S.C.

[21] Appl. No.: 672,395

[22] Filed: Mar. 31, 1976

[51] Int. Cl.² ............... C08F 30/02; C08F 130/02; C08F 2/00; C08F 4/30

[52] U.S. Cl. .................. 526/278; 8/116 P; 260/29.6 TA; 260/29.4 UA; 260/29.6 H; 260/931; 260/938; 428/272; 526/75; 526/229; 526/312

[58] Field of Search .......... 526/278, 75, 275; 260/29.6 TA, 29.6 HN, 29.6 H, 29.4 UA

[56] References Cited

U.S. PATENT DOCUMENTS

| | | | |
|---|---|---|---|
| 3,175,998 | 3/1965 | Rabinowitz | 526/278 |
| 3,351,617 | 11/1937 | Jaeger et al. | 526/278 |
| 3,766,252 | 10/1973 | Schmidt et al. | 526/278 |
| 3,823,124 | 7/1974 | Chang et al. | 526/278 |
| 3,852,233 | 12/1974 | Lindemann | 260/29.6 TA |
| 3,892,578 | 7/1975 | Golborn et al. | 526/278 |
| 4,001,158 | 1/1977 | Lindemann | 260/29.4 UA |
| 4,001,160 | 1/1977 | Lindemann | 260/29.6 H |
| 4,042,553 | 8/1977 | Lindemann | 260/29.6 H |

Primary Examiner—Herbert J. Lilling
Attorney, Agent, or Firm—Dressler, Goldsmith, Clement, Gordon & Shore

[57] ABSTRACT

Copolymerizable monoethylenic phosphites are produced by reacting an N-methylol allyl carbamate with a stoichiometric excess of a trialkyl phosphite. The monoethylenic phosphonate product can be copolymerized, especially with N-methylol acrylamide in water solution to provide water solutions of copolymers which cure at low temperature on cellulosic fabrics to provide fire retardancy and the phosphorus provided in this fashion resists removal by washing and dry cleaning.

8 Claims, No Drawings

COPOLYMERIZABLE MONOETHYLENICALLY UNSATURATED PHOSPHONATES AND FIRE RETARDANT COPOLYMERS CONTAINING THE SAME

The present invention relates to copolymerizable monoethylenically unsaturated condensates of an N-methylol allyl carbamate with trialkyl phosphite and to copolymers thereof which are useful as a flame retardant impregnant or binder for textiles, especially cellulosic textiles such as cotton.

In the present invention, a trialkyl phosphite, especially a trimethyl phosphite, is reacted with an N-methylol allyl carbamate.

The methyl groups in the trimethyl phosphite may be replaced by $C_2$-$C_4$ alkyl groups.

The reaction with mono N-methylol allyl carbamate splits out methyl alcohol. The product has the formula:

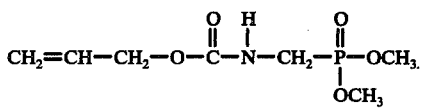

Various allyl carbamates are useful herein, especially allyl carbamate which has the formula:

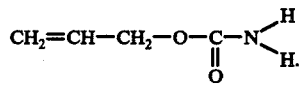

This monoethylenic monomer reacts with formaldehyde in an addition reaction, each of the two amino hydrogen atoms being reactive, to generate one or two N-methylol groups. Usually only one N-methylol group is generated, but it is possible to generate two. In this invention it is preferred to use the mono-N-methylol allyl carbamate, but the di-N-methylol allyl carbamate is also useful. The corresponding methallyl compounds can be used and also the presence of ethers as embraced by the formula:

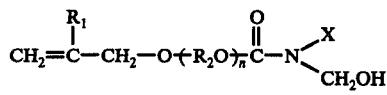

in which $R_1$ is hydrogen or methyl, $R_2$ is an alkylidene group containing from 2–4, carbon atoms, $n$ is an integer from 0–10, preferably 0–2, and X is hydrogen or methylol.

The reaction is carried out by simply adding the N-methylol carbamate to the heated phosphite and the alcohol boils away. The allylic unsaturation in the carbamate resists homopolymerization, and when a stoichiometric excess of phosphite is present, a monoethylenic condensate is formed containing very little polyethylenic material. Alcohol is the by-product of the reaction. The excess phosphite is volatile and can be removed by evaporation and reused.

It is also possible to use an etherified N-methylol allyl carbamate, but then instead of producing an alcohol, an ether is formed. Alcohol formation is more convenient, and it avoids the need to etherify the starting N-methylol allyl carbamate.

N-methylol acrylamide is not an appropriate replacement for the N-methylol allyl carbamate because the acrylamide tends to homopolymerize during processing. This is particularly important in the formation of the monoethylenic derivatives desired herein where unreacted phosphite must be present during the reaction and removed after the reaction is complete. Also, if there is any hydrolyzed phosphite present in the phosphite reactant, it will react with the acrylic unsaturation in N-methylol acrylamide.

The monoethylenic monomer is copolymerizable with other monoethylenically unsaturated monomers to provide polymers containing the phosphorus-carried methoxy group which is reactive to provide a curing capacity on baking in the range of 200°–300° F. This cure is particularly advantageous when N-methylol reactivity is also present, and this can be provided either in the same copolymer or aminoplast resins can be separately introduced. At least 5% of the copolymer is preferably constituted by the monoethylenic phosphonate.

Polymerization of the monoethylenic phosphonate can be in organic solvent solution or in aqueous medium or in bulk, but it is preferred to polymerize in aqueous solution to provide a water solution of low molecular weight water soluble copolymer. In such copolymers the monoethylenic phosphonate may constitute from 5–95% of the weight of the copolymer, but proportions of from 10–60% are preferred, and from 25–55% is particularly preferred. N-methylol acrylamide is the preferred comonomer and the copolymer desirably consists essentially of these two monomers. Small amounts up to about 10% of a plasticizing monomer such as butyl or isobutyl acrylate or methacrylate or acrylonitrile may also be present so long as its proportion is low enough not to disturb water solubility.

The aqueous solution polymerization is carried out with simple redox catalysis using moderate temperatures of 30°–100° C. The polymerization itself is not new and will be illustrated in the examples.

Acrylamide may be present in place of or in addition to the N-methylol acrylamide in the water soluble copolymers discussed above. Small proportions of other water soluble monoethylenic monomers may be present such as carboxylic acids (acrylic acid) or hydroxy monomers such as 2-hydroxyethyl acrylate or hydroxy ethers thereof (ethylene or propylene oxide adducts).

In the broader aspects of the invention where water solubility is not significant, other monomers in large amount may be present, such as styrene, methyl methacrylate, vinyl acetate, vinyl chloride, vinylidene chloride, vinyl bromide, and the like.

The aminoplast resins which may be added to enhance the cure when the N-methylol functionality in the copolymer is inadequate are subject to wide variation. Aminoplast resins are well known as a class and are generally heat-hardening condensates of amines such as urea, melamine or benzoguanamine with formaldehyde. When water solubility is desired, dimethylol urea or hexamethoxymethyl melamine can be used. Water dispersible aminoplast resins are also available and can be used.

The final copolymers are conveniently applied from water solution and may be catalyzed or not as desired. Acid catalysts are helpful to minimize the curing temperature and are preferred, these being illustrated by phosphoric acid.

The invention is illustrated in the examples which follow.

EXAMPLE 1

Production of Mono-N-Methylol Allyl Carbamate Derivative of Dialkyl (Dimethyl) Phosphonate

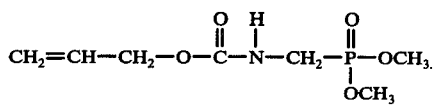

186 grams (1.5 mols) of trimethyl phosphite are placed in a round bottom flask fitted with a thermometer, addition funnel, distillation head (with water condenser), stirrer and heating mantle, and heated to 100° C. 131 grams (1 mol) of N-methylol allyl carbamate are added in small portions over 1 hour to maintain a reaction temperature of approximately 100° C. After keeping the mixture at 100° C. for an additional 10 minutes, the mixture is cooled and stripped on a rotary evaporator to remove residual trimethyl phosphite. Vacuum is used to assist the stripping operation.

EXAMPLE 2

125 grams of the product of Example 1 and 250 grams of an aqueous solution of N-methylol acrylamide (50% solids) are placed in a round bottom flask equipped as in Example 1. The mixture is heated to 60° C. and 12 grams of ammonium persulfate are added. Then, without further heating, a solution of sodium formaldehyde sulfoxylate (10% in water) is added slowly to maintain the 60° C. reaction temperature. 120 grams of this solution are used. The product is a syrupy water solution of water soluble copolymer, the monomers being substantially entirely consumed.

EXAMPLE 3

A sample of cotton sheeting (5 ounces per square yard) is impregnated with the solution of Example 2 after the solution has been diluted with water to contain 2% phosphorus, by weight. Phosphoric acid is added as catalyst to provide a pH of 3.0. The cotton picks up approximately its own weight of the catalyzed solution. The impregnated cotton is then dried in a 250° F. oven for 2½ minutes. The product contains about 2% by weight of phosphorus which flame retards the cotton and the phosphorus resists removal by washing and dry cleaning.

Unlike prior efforts, the copolymer could be condensed under normal textile curing conditions.

The invention is defined in the claims which follow.

I claim:
1. An addition copolymer of a monoethylenic phosphonate with at least one other monoethylenically unsaturated monomer, said copolymer containing the phosphorus-carried alkoxy group, said monoethylenic phosphonate constituting at least 5% of the weight of the copolymer and having the formula:

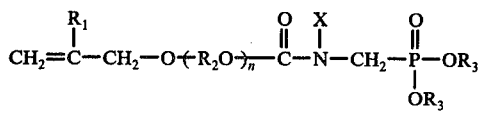

in which $R_1$ is hydrogen or methyl, $R_2$ is an alkylidene group containing from 2–4 carbon atoms, n is an integer from 0–10, $R_3$ is $C_1$–$C_4$ alkyl and X is hydrogen, methylol or

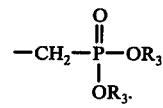

2. A copolymer as recited in claim 1 in which $R_1$ is hydrogen, $n=0$, X is hydrogen and $R_3$ is methyl.

3. A copolymer as recited in claim 2 in which said phosphonate is produced by heating a mixture of mono-N-methylol allyl carbamate and a stoichiometric excess of trimethyl phosphite to produce methanol and then removing unreacted trimethyl phosphite.

4. A copolymer as recited in claim 1 in which said phosphonate is copolymerized with other monoethylenically unsaturated monomers consisting essentially of N-methylol acrylamide or acrylamide to provide a water soluble copolymer.

5. The copolymer as recited in claim 4 in which the copolymerization is carried out in aqueous solution using redox catalysis.

6. A copolymer as recited in claim 2 in which said phosphonate constitutes from 10–60% of the weight of the copolymer.

7. A copolymer as recited in claim 4 in which said phosphonate constitutes from 25–55% of the weight of the copolymer.

8. A copolymer as recited in claim 7 in which said copolymer consists essentially of the phosphonate in which $R_1$ is hydrogen, $n=0$, X is hydrogen and $R_3$ is methyl, and N-methylol acrylamide.

* * * * *